United States Patent
Sasaki

(10) Patent No.: US 7,944,120 B2
(45) Date of Patent: May 17, 2011

(54) DRIVING APPARATUS, AND MANUFACTURING METHOD OF THE SAME

(75) Inventor: Ryota Sasaki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 223 days.

(21) Appl. No.: 12/163,361

(22) Filed: Jun. 27, 2008

(65) Prior Publication Data

US 2009/0021115 A1 Jan. 22, 2009

(30) Foreign Application Priority Data

Jul. 17, 2007 (JP) ................ P2007-186135
Jul. 17, 2007 (JP) ................ P2007-186140
Jul. 17, 2007 (JP) ................ P2007-186150

(51) Int. Cl.
*H01L 41/04* (2006.01)
*H02N 2/06* (2006.01)

(52) U.S. Cl. ........................ 310/328; 310/348

(58) Field of Classification Search ............ 310/323.01–323.21, 328, 348
See application file for complete search history.

(56) References Cited

U.S. PATENT DOCUMENTS

| 5,994,819 | A | 11/1999 | Okamoto et al. | |
|---|---|---|---|---|
| 6,528,926 | B2 | 3/2003 | Okamoto et al. | |
| 7,315,108 | B2 | 1/2008 | Okamoto et al. | |
| 2002/0084719 | A1* | 7/2002 | Okamoto et al. | 310/328 |
| 2006/0238074 | A1 | 10/2006 | Manabe | |
| 2006/0238075 | A1 | 10/2006 | Manabe et al. | |
| 2007/0228884 | A1* | 10/2007 | Manabe | 310/328 |

FOREIGN PATENT DOCUMENTS

| JP | 10-337055 A | 12/1998 |
|---|---|---|
| JP | 2002-142470 A | 5/2002 |
| JP | 2006-311794 A | 11/2006 |
| JP | 2007-74889 A | 3/2007 |
| JP | 2007-159172 A | 6/2007 |

* cited by examiner

*Primary Examiner* — Derek J Rosenau
(74) *Attorney, Agent, or Firm* — Birch, Stewart, Kolasch & Birch, LLP

(57) ABSTRACT

A driving apparatus comprises: an electromechanical conversion element that expands and contracts in an extending direction of a given fiducial line; a driving shaft mounted on one end of the electromechanical conversion element in the extending direction; a driven member frictionally engaged with the driving shaft; a holder that supports the electromechanical conversion element and comprises a bearing portion for the driving shaft; and an inclination adjusting mechanism, disposed in the bearing portion, that adjusts inclination of the driving shaft with respect to the fiducial line.

7 Claims, 20 Drawing Sheets

DRIVING APPARATUS, AND MANUFACTURING METHOD OF THE SAME

BACKGROUND OF THE INVENTION

1. Field of the Invention

The present invention relates to a driving apparatus suited for driving a lens or the like in a mobile telephone with a camera, a small-sized digital camera or the like, and a manufacturing method for the driving apparatus.

2. Description of the Related Art

A driving apparatus, as known in the aforementioned technical field of the related art (as referred to JP-A-2002-142470, JP-A-2007-74889, JP-A-10-337055, and JP-A-2006-311794, for example), comprises: an electromechanical conversion element for expanding and contracting in the extending direction of a given fiducial line; a driving shaft mounted on one end of the electromechanical conversion element in the extending direction of the given fiducial line; a driven member frictionally engaged with the driving shaft; and a holder supporting the electromechanical conversion element and having a bearing hole of the driving shaft.

In these driving apparatus, driving pulses having saw-tooth waveforms are applied to the electromechanical conversion element so that the electromechanical conversion element is deformed in the state where an expanding rate and a contracting rate are different. When the electromechanical conversion element is deformed at a low rate, moreover, the driven member is caused by the friction to stand still with respect to the driving shaft. When the electromechanical conversion element is deformed at a high rate, on the contrary, the driven member is caused by the inertia to move with respect to the driving shaft. By applying the driving pulses having the saw-tooth waveforms repeatedly to the electromechanical conversion element, therefore, the driven member can be intermittently moved at a fine pitch.

At the time of manufacturing the aforementioned driving apparatus, however, a clearance exists between the outer face of the driving shaft and the inner face of the bearing hole. Therefore, an adhesive for supporting the electromechanical conversion element in the holder may be hardened in the state where the driving shaft is inclined with respect to a given fiducial line. An extremely high optical performance is demanded especially for driving a lens or the like in the mobile telephone with the camera, the small-sized digital camera or the like. Therefore, even a small inclination of the driving shaft with respect to the given fiducial line raises a serious problem.

SUMMARY OF THE INVENTION

Therefore, the invention has been conceived in view of the background thus far described, and has an object to provide a driving apparatus, which can prevent the inclination of a driving shaft with respect to a given fiducial line, and a method for manufacturing the driving apparatus.

In order to achieve the aforementioned object, a first driving apparatus according to the invention comprises: an electromechanical conversion element that expands and contracts in an extending direction of a given fiducial line; a driving shaft mounted on one end of the electromechanical conversion element in the extending direction; a driven member frictionally engaged with the driving shaft; a holder that supports the electromechanical conversion element and comprises a bearing portion for the driving shaft; and an inclination adjusting mechanism, disposed in the bearing portion, that adjusts inclination of the driving shaft with respect to the fiducial line.

This driving apparatus is enabled to adjust the inclination of the driving shaft with respect to the given fiducial line by using the inclination adjusting mechanism. At the time of manufacturing the driving apparatus, therefore, even if the electromechanical conversion element is supported by the holder with the driving shaft being inclined with respect to the fiducial line, this inclination of the driving shaft can be corrected.

In the first driving apparatus according to the invention, it is preferred that the electromechanical conversion element is elastically supported by the holder. In this case, the adjustment of the inclination of the driving shaft with respect to the given fiducial line is facilitated, and the stress to occur after the adjustment in the electromechanical conversion element is lightened.

The first driving apparatus according to the invention may be a driving apparatus wherein the holder further comprises a fitted portion having an inner face, the inner face being formed with the fiducial line as a center line, the driving shaft comprises a hollow portion at at least one of end portions of the driving shaft, the inclination adjusting mechanism comprises: a first column portion fitted in the fitted portion of the holder; and a second column portion fitted in the hollow portion of the driving shaft, and a first center line of the first column portion and a second center line of the second column portion are eccentric. Alternatively, the first driving apparatus according to the invention may be a driving apparatus wherein the holder further comprises a fitted portion having an inner face, the inner face being formed with the fiducial line as a center line, the inclination adjusting mechanism comprises: a column portion fitted in the fitted portion of the holder; and a cylindrical portion in which one end portion of the driving shaft is fitted, and a first center line of the column portion and a second center line of the cylindrical portion are eccentric. In these cases, the inclination of the driving shaft with respect to the fiducial line can be adjusted easily and reliably by rotating the column portion fitted in the fitted portion having the inner face formed on the holder, on the fiducial line.

In order to achieve the aforementioned object, moreover, according to the invention, there is provided a method for manufacturing a driving apparatus, the driving apparatus comprising: an electromechanical conversion element that expands and contracts in an extending direction of a given fiducial line; a driving shaft mounted on one end of the electromechanical conversion element in the extending direction; a driven member frictionally engaged with the driving shaft; and a holder that supports the electromechanical conversion element, the method comprising adjusting inclination of the driving shaft with respect to the fiducial line before an adhesive for supporting the electromechanical conversion element in the holder is hardened.

In this driving apparatus manufacturing method, the inclination of the driving shaft with respect to the fiducial line is adjusted before the adhesive for supporting the electromechanical conversion element in the holder is hardened. Therefore, the electromechanical conversion element can be supported in the holder such that the inclination of the driving shaft with respect to the given fiducial line is prevented.

In order to achieve the aforementioned object, a second driving apparatus according to the invention comprises: an electromechanical conversion element that expands and contracts in an extending direction of a given fiducial line; a driving shaft that is mounted on one end of the electromechanical conversion element in the extending direction and comprises a hollow portion at at least one of end portions of the driving shaft; a driven member that is frictionally engaged with the driving shaft; a holder that supports the electromechanical conversion element and comprises a bearing portion for the driving shaft; and a support member, mounted in the bearing portion, that comprises a fixed portion to be fixed in the holder and a fitted portion to be fitted in the hollow portion of the driving shaft.

In this driving apparatus, the fixed portion of the support member disposed in the bearing portion of the driving shaft is fixed in the holder, and the fitted portion of the support member is fitted in the hollow portion formed in at least one end portion of the driving shaft. As a result, the supporting range of the driving shaft by the fitted portion can be made longer than that of the case, in which the driving shaft is supported only by the bearing hole, for example. Therefore, it is possible to prevent the electromechanical conversion element from being supported by the holder with the driving shaft being inclined with respect to the given fiducial line.

In the second driving apparatus according to the invention, it is preferred that the fitted portion has an end directed to the electromechanical conversion element, the driven member further comprises an engaged portion frictionally engaged with the driving shaft, the engaged portion having a first end directed to the fixed portion and a second end directed to the electromechanical conversion element, the end of the fitted portion is positioned closer to the electromechanical conversion element than both of (i) the second end of the engaged portion when the engaged portion moves to the largest stroke in a direction away from the electromechanical conversion element and (ii) the first end of the engaged portion when the engaged portion moves to the largest stroke toward the electromechanical conversion element. When the driving shaft receives shocks from a fall or the like, the driving shaft may be broken by the stress concentrated either at the other end (the second end) of the engaged portion of the case when the engaged portion moves to the largest stroke on the one side (in a direction away from the electromechanical conversion element), or at the one end (the first end) of the engaged portion when the engaged portion moves to the largest stroke on the other side (toward the electromechanical conversion element). Therefore, if the other end of the fitted portion is positioned closer to the other side than both the other end of the engaged portion when the engaged portion moves to the largest stroke on the one side, and the one end of the engaged portion when the engaged portion moves to the largest stroke on the other side, the fitted portion becomes the core of the driving shaft in the hollow portion, so that the driving shaft can be prevented from being broken when it receives the shocks from the fall or the like.

In the second driving apparatus according to the invention, it is preferred that the fitted portion further comprises notched portions extending in the extending direction in an outer face of the fitted portion so as to support the driving shaft at at least three portions by the fitted portion. Alternatively, it is preferred that the hollow portion of the driving shaft comprises notched portions extending in the extending direction in an inner face of the hollow portion so as to support the driving shaft at at least three portions by the fitted portion. In these cases, the contact area between the outer face of the fitted portion and the inner face of the hollow portion of the driving shaft can be reduced to smoothen the reciprocations of the driving shaft relative to the fitted portion. Moreover, the driving shaft is positioned with respect to the fitted portion so that the inclination of the driving shaft with respect to the given fiducial line can be reliably prevented.

In order to achieve the aforementioned object, a third driving apparatus according to the invention comprises: an electromechanical conversion element that expands and contracts in an extending direction of a given fiducial line; a driving shaft mounted on one end of the electromechanical conversion element in the extending direction; a driven member frictionally engaged with the driving shaft; a holder that supports the electromechanical conversion element and comprises a bearing portion for the driving shaft; and a regulating member, disposed in the bearing portion, that regulates inclination of the driving shaft with respect to the fiducial line.

In this driving apparatus, the inclination of the driving shaft with respect to the given fiducial line is regulated by the regulating member mounted in the bearing grooves of the holder. Therefore, it is possible to prevent the electromechanical conversion element reliably from being supported by the holder while the driving shaft being inclined with respect to the given fiducial line.

In the third driving apparatus according to the invention, it is preferred that the bearing portion is formed as a groove, and the regulating member is mounted on an opening side of the bearing portion. In this case, the driving shaft can be arranged in the bearing portions formed as grooves in the holder, and the regulating member can then be mounted in the opening sides of the bearing portions. Therefore, it is possible to improve the assembling properties of the driving apparatus.

In the third driving apparatus according to the invention, it is preferred that the regulating member comprises: a fixed portion fixed in the holder; and a pushing portion that pushes the driving shaft onto an inner face of the bearing portion; and the driving shaft is supported in the bearing portion at at least three portions by the inner face of the bearing portion and the pushing portion. Thus, the driving shaft is positioned such that it is supported at at least three portions by the inner face of the bearing portion and by the pushing portion for pushing the driving shaft onto the inner face. Therefore, it is possible to prevent the inclination of the driving shaft more reliably with respect to the given fiducial line.

At this time, the pushing portion may be either a screw fastened in the fixed portion or a spring mounted in the fixed portion. In case the pushing portion is the screw, the pushing force of the driving shaft onto the inner face of the bearing portion can be adjusted by the fastening degree of the pushing portion. In case the pushing portion is the spring, on the other hand, the pushing force of the driving shaft onto the inner face of the bearing groove can be adjusted by changing the spring constant.

DETAILED DESCRIPTION OF THE INVENTION

Figure 1A:
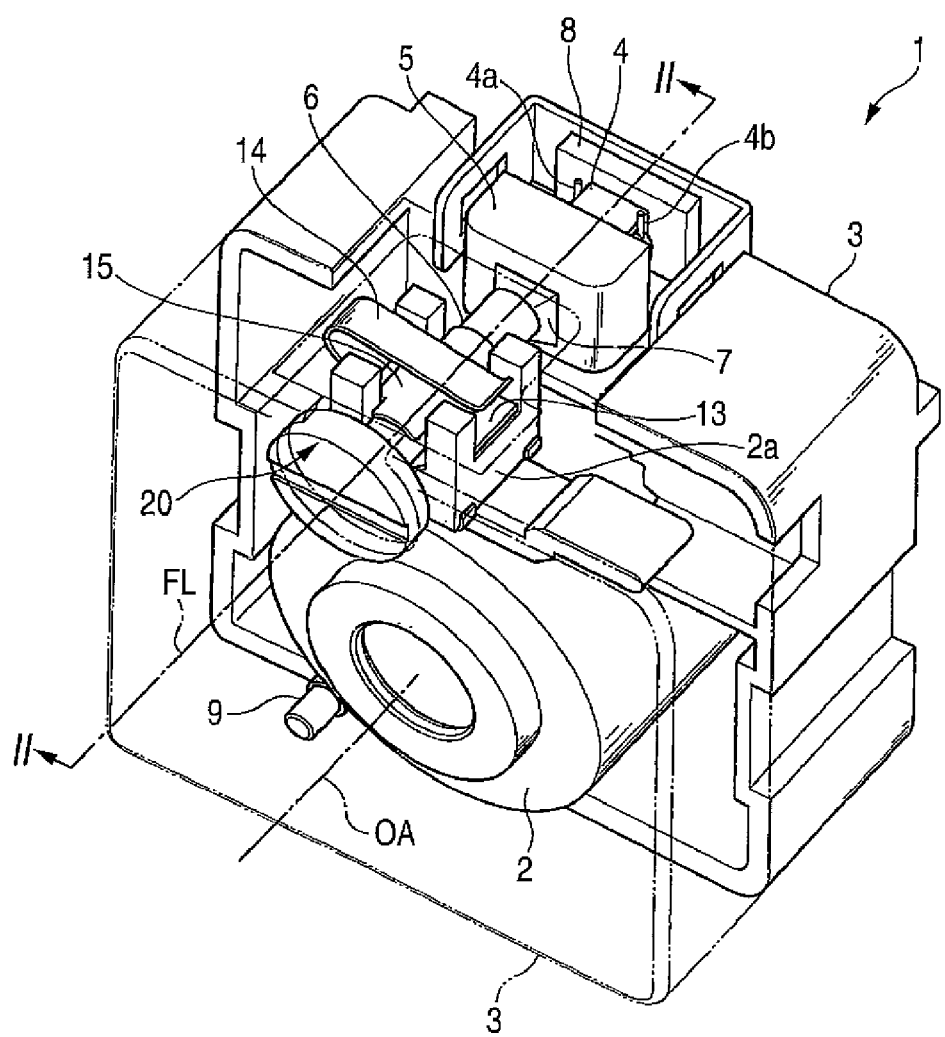
FIG. 1A is a perspective view showing a first embodiment of a driving apparatus according to the invention.

Preferred embodiments of the invention are described in detail in the following with reference to the accompanying drawings. Here, the same or corresponding portions in the individual drawings are designated by the common reference numerals, and their repeated descriptions are omitted.

Figure 1B:
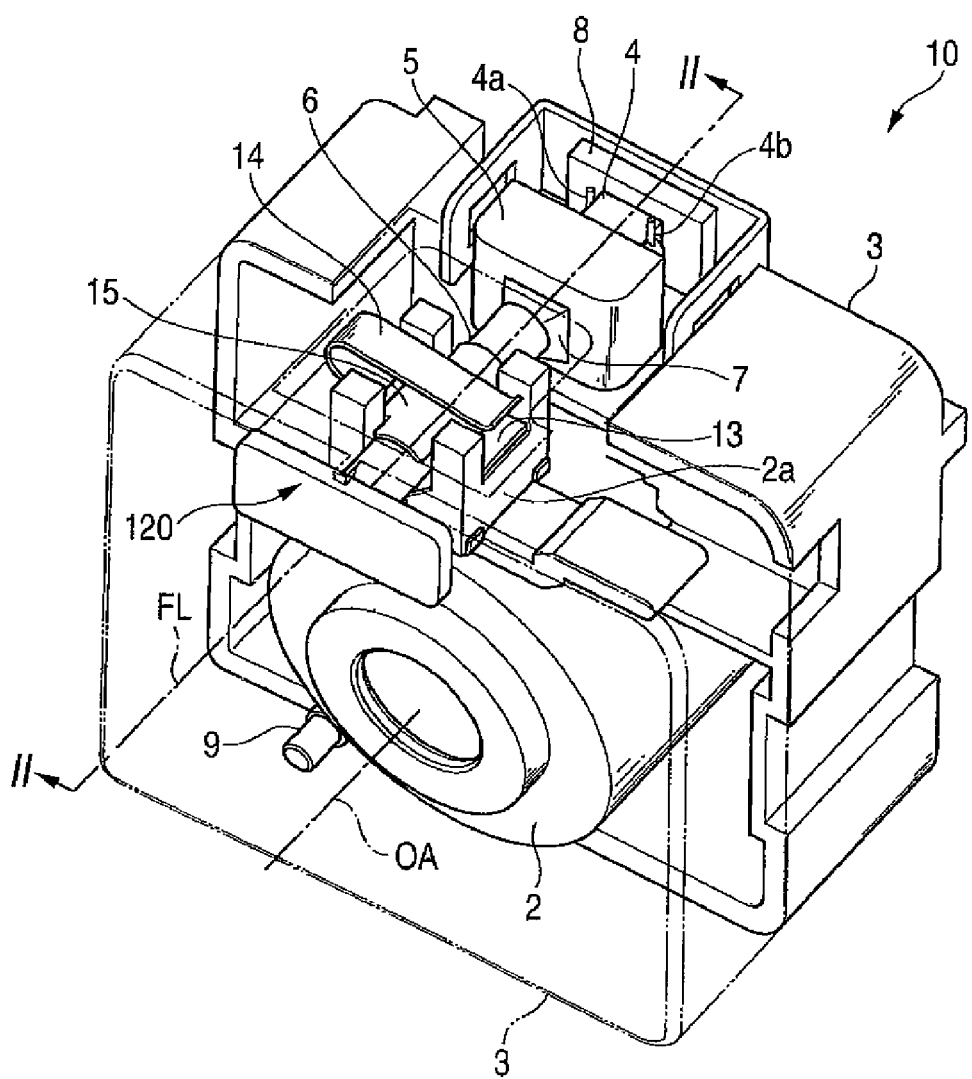
FIG. 1B is a perspective view showing a second embodiment of the driving apparatus according to the invention.
Figure 1C:
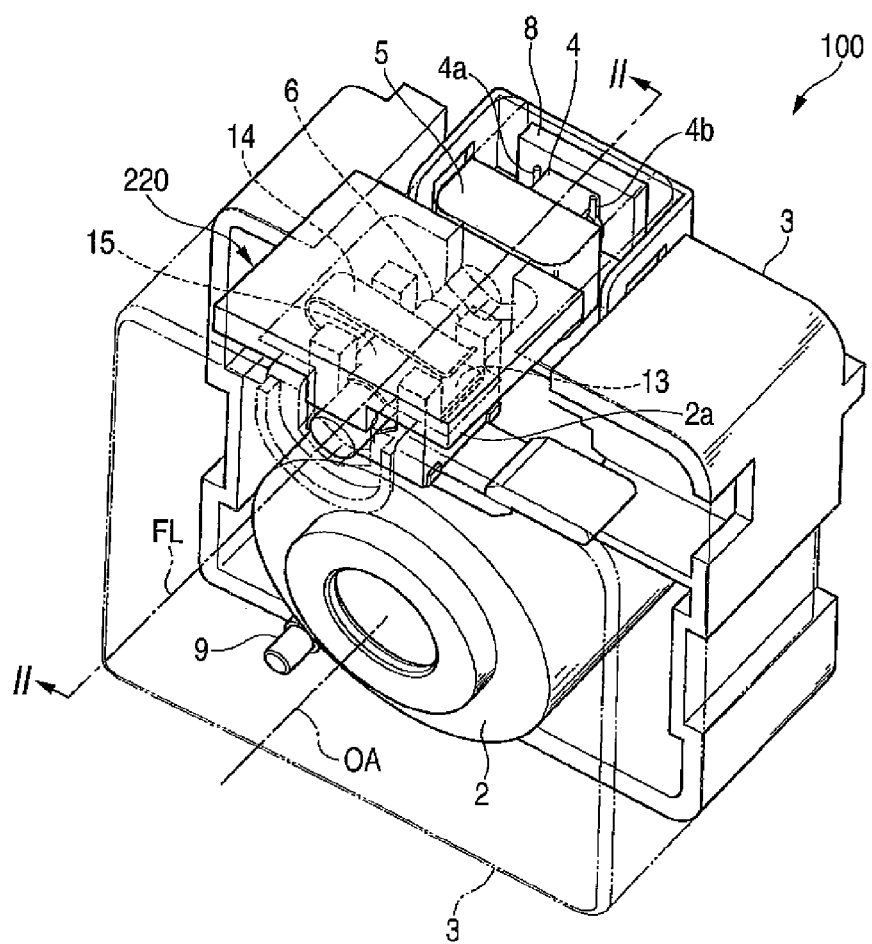
FIG. 1C is a perspective view showing a third embodiment of the driving apparatus according to the invention.
Figure 2A:
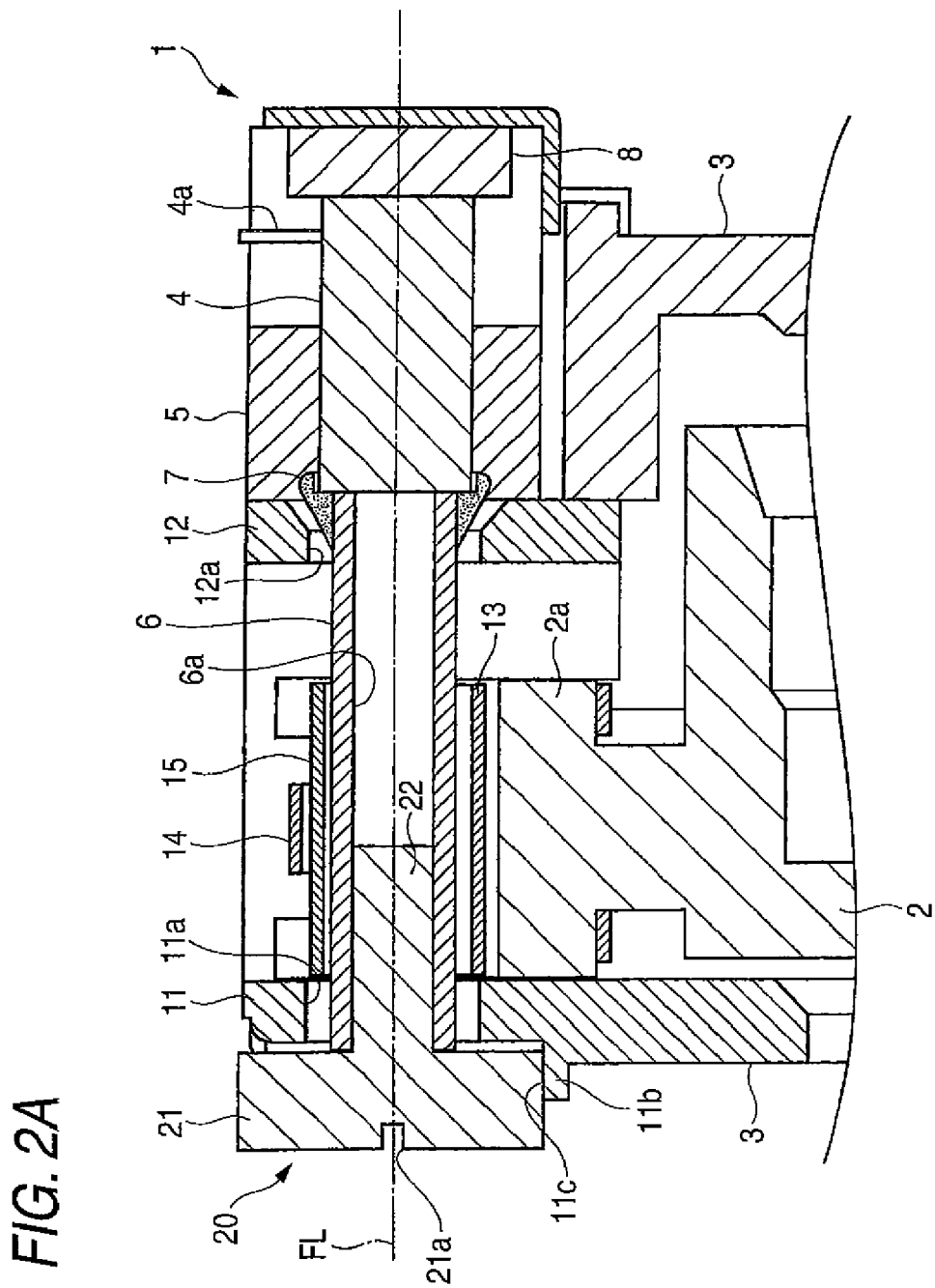
FIG. 2A is a sectional view of a portion shown in FIG. 1A and taken along line II-II.
Figure 2B:
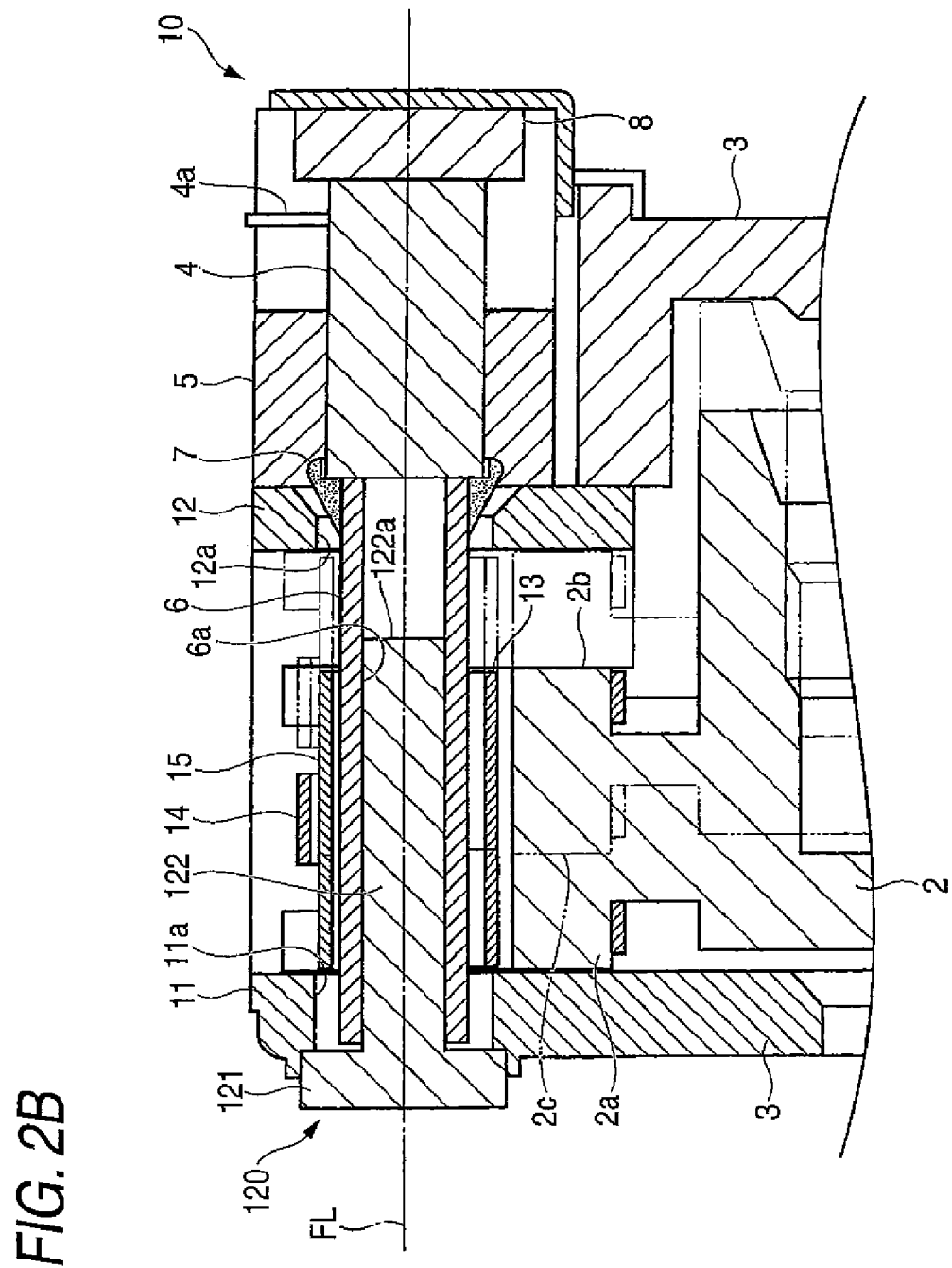
FIG. 2B is a sectional view of a portion shown in FIG. 1B and taken along line II-II.
Figure 2C:
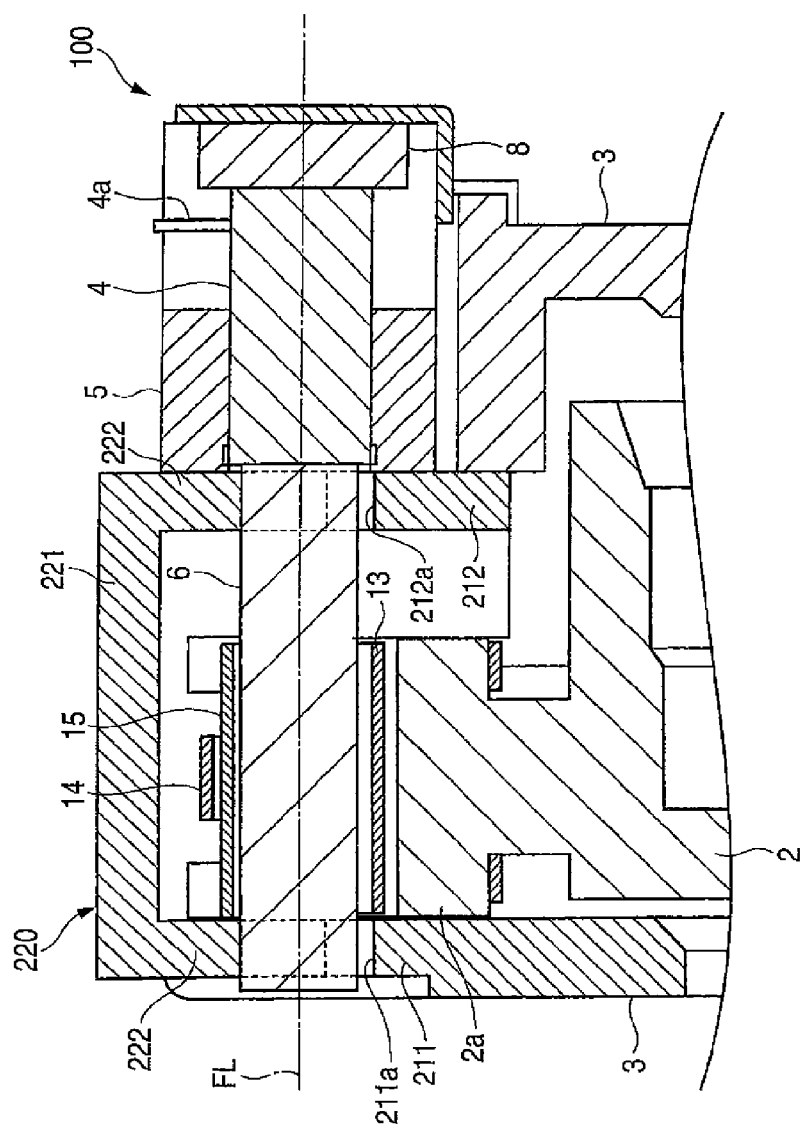
FIG. 2C is a sectional view of a portion shown in FIG. 1C and taken along line II-II.

FIG. 1A is a perspective view showing a first embodiment of a driving apparatus according to the invention, and FIG. 2A is a sectional view of a portion taken along line II-II shown in FIG. 1A. FIG. 1B is a perspective view showing a second embodiment of the driving apparatus according to the invention, and FIG. 2B is a sectional view of a portion taken along line II-II shown in FIG. 1B. FIG. 1C is a perspective view showing a third embodiment of the driving apparatus according to the invention, and FIG. 2C is a sectional view of a portion taken along line II-II shown in FIG. 1C. As shown in FIGS. 1A, 2A, 1B, 2B, 1C and 2C, the driving apparatus 1 of the first embodiment, the driving apparatus 10 of the second embodiment, and the driving apparatus 100 of the third embodiment are apparatus for driving a lens held by a lens frame (or a driven member) 2, along an optical axis OA, and find their preferred applications in a mobile telephone with a camera, a small-sized digital camera or the like.

The driving apparatus 1, 10 or 100 is provided with a holder 3 for housing the lens frame 2. The holder 3 supports a piezoelectric element (or an electromechanical conversion element) 4 for telescoping in the extending direction of a fiducial line FL parallel to the optical axis OA. Specifically, the piezoelectric element 4 is so elastically supported by the holder 3 as is held transversely of the extending direction of the fiducial line FL by a silicone cap 5 adhered to the holder 3 by a silicone adhesive. Here, the piezoelectric element 4 is provided with input terminals 4a and 4b for applying driving pulses.

A driving shaft 6 is so fixed by an adhesive (in the first and second embodiments, the hollow driving shaft 6 is fixed by an adhesive 7) to one end of the piezoelectric element 4 in the extending direction of the fiducial line FL as to extend along the fiducial line FL. The driving shaft 6 is formed of a graphite composite, in which graphite crystals are firmly combined, such as carbon graphite, into a cylindrical shape in the first and second embodiments and into a column shape in the third embodiment. On the other hand, a weight member 8 is fixed by an adhesive to the other end of the piezoelectric element 4 in the extending direction of the fiducial line FL. The weight member 8 applies a load to the other end of the piezoelectric element 4 so as to prevent the other end of the piezoelectric element 4 from being more displaced than the one end. The weight member 8 preferably has a larger mass than that of the driving shaft 6 so that the expansion and contraction of the piezoelectric element 4 may be efficiently transmitted to the driving shaft 6.

In the first and second embodiments, the driving shaft 6 has its one end portion loosely fitted in a bearing hole 11a (or a bearing portion) formed in a partition 11 of the holder 3. On the other hand, the other end portion of the driving shaft 6 is inserted into a through hole 12a formed in a partition 12 of the holder 3. As a result, the driving shaft 6 can reciprocate along the fiducial line FL.

In the third embodiment, the driving shaft 6 has its one end portion arranged in a bearing groove (or a bearing portion) 211a formed in a partition 211 of the holder 3. The other end portion of the driving shaft 6 is arranged in a bearing groove (or a bearing portion) 212a formed in a partition 212 of the holder 3. As a result, the driving shaft 6 can reciprocate along the fiducial line FL.

The driving shaft 6 is frictionally engaged by an engaging portion 2a of the lens frame 2, which is regulated in its moving region by and between the partitions 11 (211) and 12 (212). Specifically, a plate member 13 of a V-shaped section fixed on the engaging portion 2a and a plate member 15 of a V-shaped section urged toward the plate member 13 by a leaf spring 14 retained on the engaging portion 2a clamp the driving shaft 6, so that the engaging portion 2a is so mounted in the driving shaft 6 as to establish a given frictional force as it moves. Here, a pin 9, which is arranged in the groove of the U-shaped section of the lens frame 2, is spanned in the extending direction of the fiducial line FL. In short, the driving shaft 6 functions as a guide pin, too, and the pin 9 functions as a rotation stopping pin of the lens frame 2, too.

Figure 3:
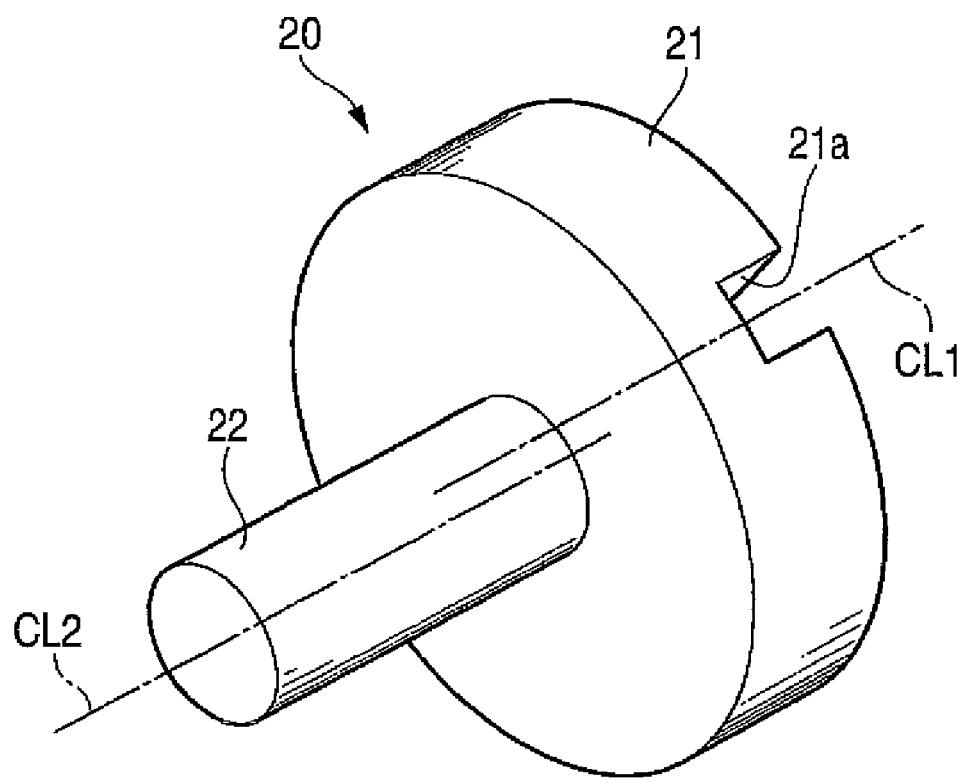
FIG. 3 is a perspective view of an inclination adjusting mechanism shown in FIG. 1A.

In the first embodiment, as shown in FIG. 1A and FIG. 2A, an inclination adjusting mechanism 20 for adjusting the inclination of the driving shaft 6 with respect to the fiducial line FL is disposed in the bearing hole 11a of the partition 11. The inclination adjusting mechanism 20 is provided with a column portion (or a first column portion) 21, which is tightly fitted from one side in a fitting portion 11b having an inner face 11c formed on the center line of the fiducial line FL in the partition 11, and a column portion (or a second column portion) 22, which is loosely fitted from one side in the hollow portion 6a of the driving shaft 6. Between the other end face of the column portion 21 and the one end face of the driving shaft 6, there is formed a clearance for keeping them out of contact even when the piezoelectric element 4 extends to its largest stroke. The inclination adjusting mechanism 20 is enabled to rotate on the fiducial line FL by making use of a groove 21a formed in the column portion 21. As shown in FIG. 3, the centerline (or a first center line) CL1 of the column portion 21 and the center line (or a second center line) CL2 of the column portion 22 are made eccentric by the order of 1/100 mm, for example.

In the driving apparatus 1 thus constituted, the centerline CL1 of the column portion 21 and the centerline CL2 of the column portion 22 are made eccentric in the inclination adjusting mechanism 20. By rotating the column portion 21, which is fitted in the fitting portion 11b having the inner face 11c formed in the partition 11, on the fiducial line FL, therefore, the inclination of the driving shaft 6 with respect to the fiducial line FL can be adjusted easily and reliably. At the time of manufacturing the driving apparatus 1, therefore, the inclination of the driving shaft 6 can be corrected even when the piezoelectric element 4 is so supported by the holder 3 that the driving shaft 6 is inclined with respect to the fiducial line FL. As a result, a remarkably high optical performance can be acquired when the lens or the like is driven in the mobile telephone with the camera, the small-sized digital camera or the like, for example. Here, if the column portion 21 is adhered and fixed to the holder 3 after the inclination of the driving shaft 6 was corrected, it is possible to keep the state, in which the inclination of the driving shaft 6 is adjusted with respect to the fiducial line FL.

Moreover, the inclination of the driving shaft 6 with respect to the fiducial line FL can be adjusted by using the inclination adjusting mechanism 20, the driving shaft 6 can be made into the guide pin of the lens frame 2 merely by providing the pin 9 as the rotation stopping pin of the lens frame 2. As a result, even if no guide frame for the lens frame 2 is provided in addition to the driving shaft 6, the deterioration of the optical performance can be prevented when the lens or the like is driven in the mobile telephone with the camera, the small-sized digital camera or the like, for example.

On the other hand, the piezoelectric element 4 is elastically supported through the silicone cap 5 by the holder 3. As a result, the adjustment of the inclination of the driving shaft 6 with respect to the fiducial line FL is facilitated, and the stress to build up in the piezoelectric element 4 after the adjustment is lightened. Here, the hardness (or the hardness of the silicone cap 5, for example) at the time when the piezoelectric element 4 is elastically supported by the holder 3 is suitably a durometer A 90 or less and is preferably a durometer A 20 to 60.

At the time of manufacturing the driving apparatus 1, the inclination of the driving shaft 6 with respect to the fiducial line FL may be adjusted before the silicon adhesive for supporting the piezoelectric element 4 in the holder 3 (i.e., for adhering the silicone cap 5 for holding the piezoelectric element 4, to the holder 3). According to this method for manufacturing the driving apparatus in the piezoelectric element 4 can be held in the holder 3 while preventing the inclination of the driving shaft 6 with respect to the fiducial line FL. Moreover, this manufacturing method of the driving apparatus 1 is also effective in the case using not an elastic adhesive such as the silicone adhesive but such an adhesive as becomes highly rigid when hardened.

Figure 9:
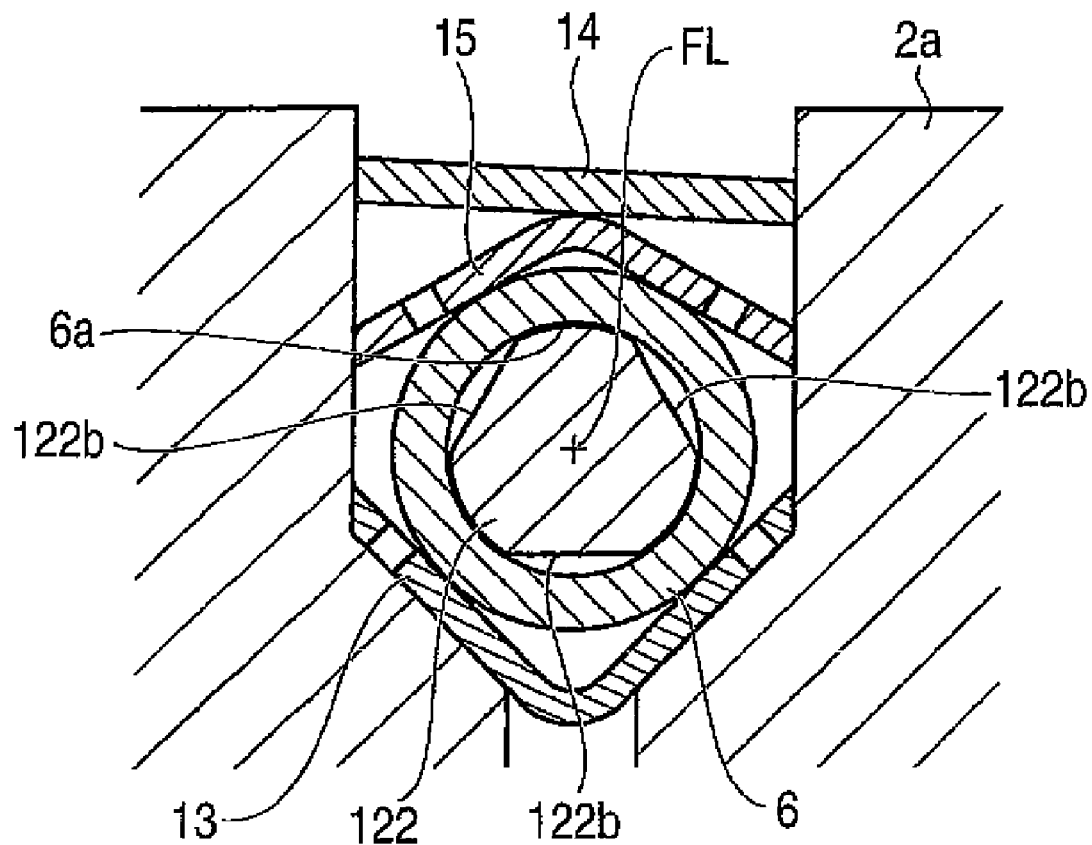
FIG. 9 is a longitudinal section of an engaged portion of a lens frame shown in FIG. 2B.

In the second embodiment, as shown in FIG. 1B and FIG. 2B, a support member 120 for supporting the driving shaft 6 is mounted in the bearing hole 11a of the partition 11. This support member 120 is provided with a fixed portion 121 of a rectangular plate shape fixed to the holder 3, and a fitted portion 122 loosely fitted in the hollow portion 6a of the driving shaft 6 from the one end side of the same. Between the other end face of the fixed portion 121 and the one end face of the driving shaft 6, there is formed a clearance for keeping those end faces out of contact even when the piezoelectric element 4 extends to its largest stroke. The fitted portion 122 has its other end 122a positioned on the other sides of both the other end 2b of the engaged portion 2a of the case, in which the engaged portion 2a frictionally engaged with the driving shaft 6 moved to the largest stroke of the one side, and the one end 2c of the engaged portion 2a of the case, in which the engaged portion 2a moved to the largest stroke of the other side. As shown in FIG. 9, notched portions 122b are formed in the outer face of the fitted portion 122 by the three notched faces extending in the extending direction of the fiducial line FL, so that the driving shaft 6 may be supported at the three portions by the fitted portion 122.

In the driving apparatus 10 thus constituted, the fixed portion 121 of the support member 120, as mounted in the bearing hole 11a of the partition 11, is fixed in the holder 3, and the fitted portion 122 of the support member 120 is fitted in the hollow portion 6a of the driving shaft 6. As a result, the supporting range of the driving shaft 6 by the fitted portion 122 can be made longer than that of the case, in which the driving shaft 6 is supported only by the bearing hole, for example. Therefore, it is possible to prevent the piezoelectric element 4 from being supported by the holder 3 with the driving shaft 6 being inclined with respect to the fiducial line FL. As a result, an extremely high optical performance can be acquired when the lens or the like is driven in the mobile telephone with the camera, the small-sized digital camera or the like, for example.

Moreover, the inclination of the driving shaft 6 with respect to the fiducial line FL is prevented by the support member 120 so that the driving shaft 6 can be made as the guide pin of the lens frame 2 merely by providing the pin 9 as the rotation stopping pin of the lens frame 2. Without any guide pin of the lens frame 2 in addition to the driving shaft 6, therefore, the deterioration of the optical performance can be prevented when the lens or the like is driven in the mobile telephone with the camera, the small-sized digital camera or the like, for example.

Moreover, the other end 122a of the fitted portion 122 is positioned closer to the other side than both the other end 2b of the engaged portion 2a frictionally engaged with the driving shaft 6 of the case, in which the engaged portion 2a moves to the largest stroke on the one side, and the one end 2c of the case, in which the engaged portion 2a moves to the largest stroke on the other side. As a result, the fitted portion 122 becomes the core of the driving shaft 6 in the hollow portion, so that the driving shaft 6 can be prevented from being broken when it receives shocks from a fall or the like. This reason is explained in the following. When the driving shaft 6 receives shocks from a fall or the like, the driving shaft 6 may be broken by the stress concentrated either at the other end 2b of the engaged portion 2a of the case, in which the engaged portion 2a moves to the largest stroke on the one side, or at the one end 2c of the engaged portion 2a of the case, in which the engaged portion 2a moves to the largest stroke on the other side.

Moreover, notched portions 122b are formed in the outer face of the fitted portion 122 by the three notched faces extending in the extending direction of the fiducial line FL, so that the driving shaft 6 may be supported at the three portions by the fitted portion 122. In this case, the contact area between the outer face of the fitted portion 122 and the inner face of the hollow portion 6a of the driving shaft 6 can be reduced to smoothen the reciprocations of the driving shaft 6 relative to the fitted portion 122. Moreover, the driving shaft 6 is positioned with respect to the fitted portion 122 so that the inclination of the driving shaft 6 with respect to the fiducial line FL can be reliably prevented.

When the driving apparatus 10 is to be manufactured, the fixing position of the fixed portion 121 of the support member 120 with respect to the one end face of the holder 3 may be changed to adjust the inclination of the driving shaft 6 with respect to the fiducial line FL, before the silicone adhesive for supporting the piezoelectric element 4 in the holder 3 (that is, for adhering the silicone cap 5 for holding the piezoelectric element 4, to the holder 3) is hardened. According to this manufacturing method of the driving apparatus 10, the piezoelectric element 4 can be supported in the holder 3 while preventing the inclination of the driving shaft 6 with respect to the fiducial line FL. Moreover, this manufacturing method of the driving apparatus 10 is also effective not only in the case of using an elastic adhesive such as the silicone adhesive but also in the case of using an adhesive to become highly rigid when hardened.

Figure 13:
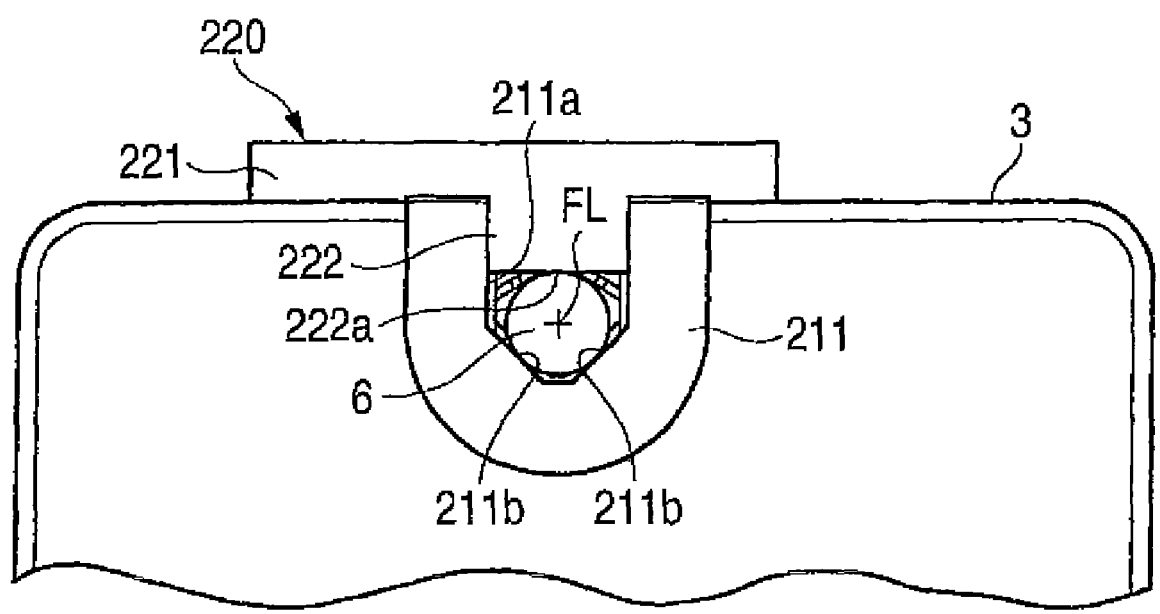
FIG. 13 is a front elevation of the vicinity of a bearing groove shown in FIG. 1C.

In the third embodiment, as shown in FIG. 1C and FIG. 2C, a regulating member 220 for regulating the inclination of the driving shaft 6 with respect to the fiducial line FL is disposed on the opening sides of the bearing grooves 211a and 212a, and is mounted on the holder 220. The regulating member 220 is provided with a fixed portion 221 to be fixed in the holder 3, and a pushing portion 222 for pushing the driving shaft 6 to the inner faces of the bearing grooves 211a and 212a. The pushing portion 222 urges the driving shaft 6 onto the inner faces of the bearing grooves 211a and 212a so that the force may act in the direction substantially perpendicular to the fiducial line FL. As shown in FIG. 13, the driving shaft 6 is supported at three portions in the bearing groove 211a by two inner faces 211b formed into a V-shaped section and by an inner face 222a of the pushing portion 222. This constitution is likewise applied to the bearing groove 212a. Here, the pushing force of the driving shaft 6 onto the inner faces of the bearing grooves 211a and 212a is so strong as not to inhibit the reciprocations of the driving shaft 6 along the fiducial line FL.

In the driving apparatus 100 thus constituted, the inclination of the driving shaft 6 with respect to the fiducial line FL is regulated by the regulating member 220 mounted in the bearing grooves 211a and 212a of the holder 3. More specifically, the driving shaft 6 is positioned such that it is supported at three portions by the two inner faces of the individual bearing grooves 211a and 212a and by the pushing portion 222 for pushing the driving shaft 6 onto those inner faces. Therefore, it is possible to prevent the piezoelectric element 4 reliably from being supported by the holder 3 while the driving shaft 6 being inclined with respect to the fiducial line FL. As a result, an extremely high optical performance can be acquired when the lens or the like is driven in the mobile telephone with the camera, the small-sized digital camera or the like, for example.

Moreover, the inclination of the driving shaft 6 with respect to the fiducial line. FL is regulated by the regulating member 220, so that the driving shaft 6 can be used as the guide pin of the lens frame 2 merely by providing the pin 9 as the rotation stopping pin for the lens frame 2. As a result, even if no guide frame for the lens frame 2 is provided in addition to the driving shaft 6, the deterioration of the optical performance can be prevented when the lens or the like is driven in the mobile telephone with the camera, the small-sized digital camera or the like, for example.

Moreover, the regulating member 220 is mounted in the opening sides of the bearing grooves 211a and 212a. As a result, the driving shaft 6 can be arranged in the bearing grooves 211a and 212a from their opening sides, and the regulating member 220 can then be mounted in the opening sides of the bearing grooves 211a and 212a. Therefore, it is possible to improve the assembling properties of the driving apparatus 100.

Figure 4:
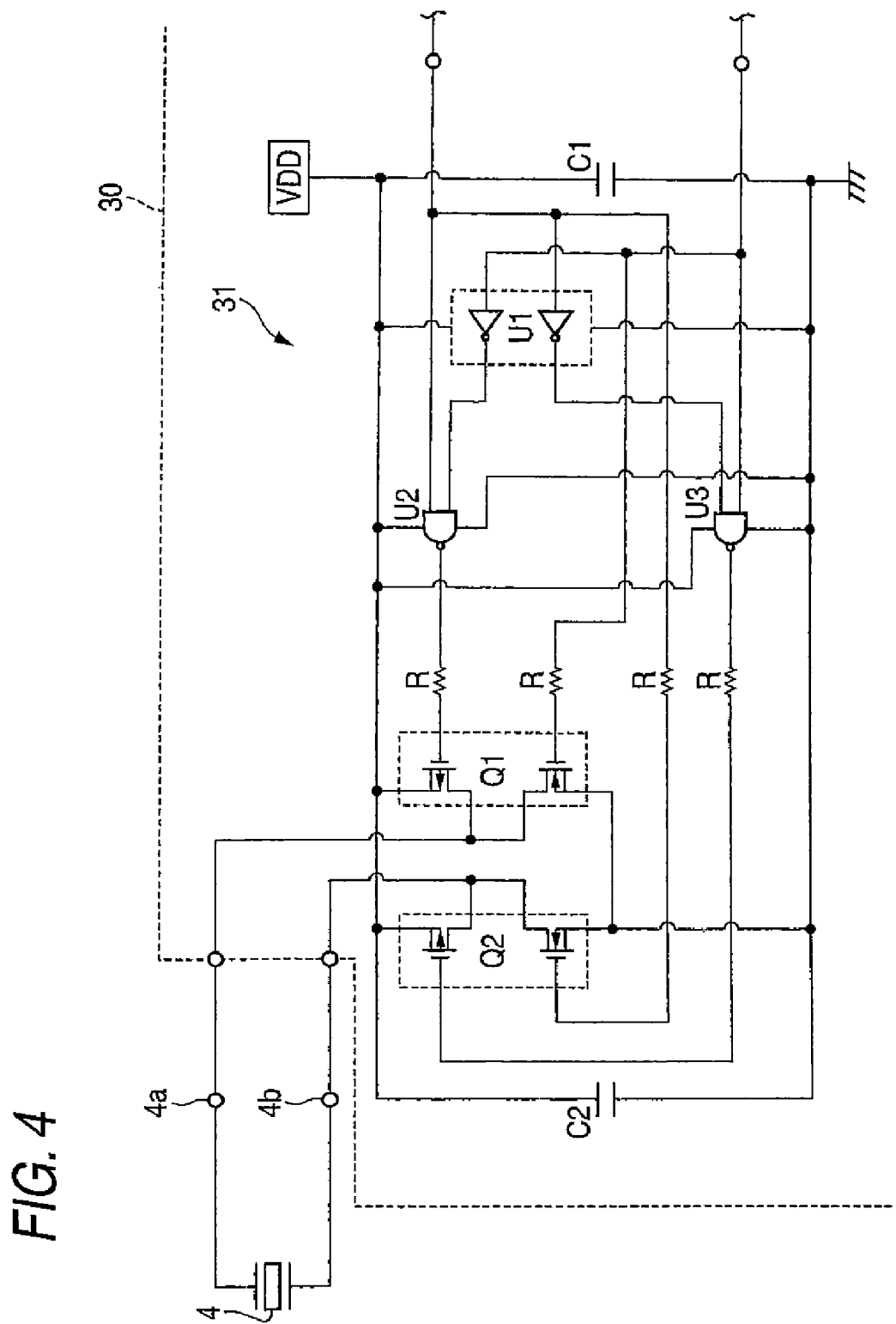
FIG. 4 is a circuit diagram of a driving circuit for activating a piezoelectric element shown in FIGS. 1A, 1B and 1C.
Figure 5A:
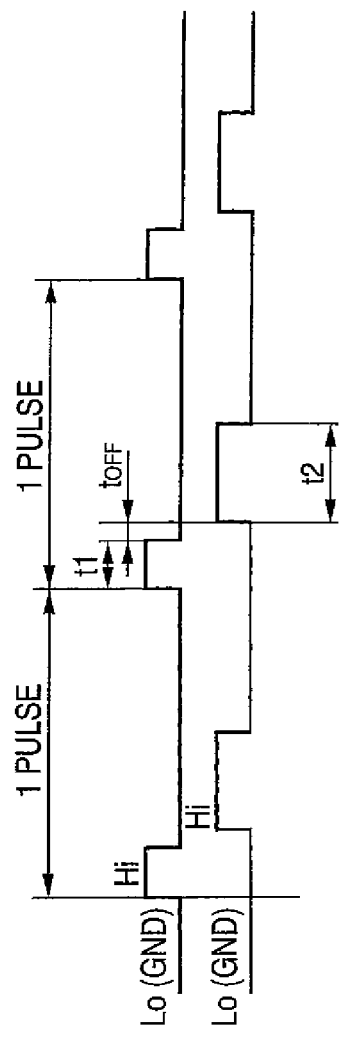
FIGS. 5A and 5B are waveform diagrams of an input signal to be inputted to the driving circuit shown in FIG. 4.
Figure 5B:
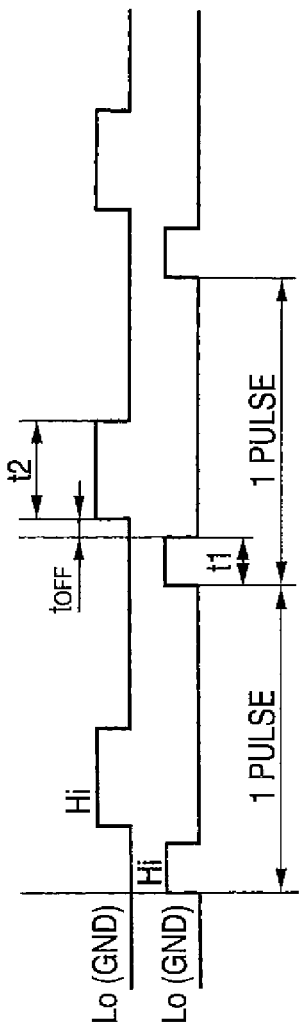
Figure 6A:
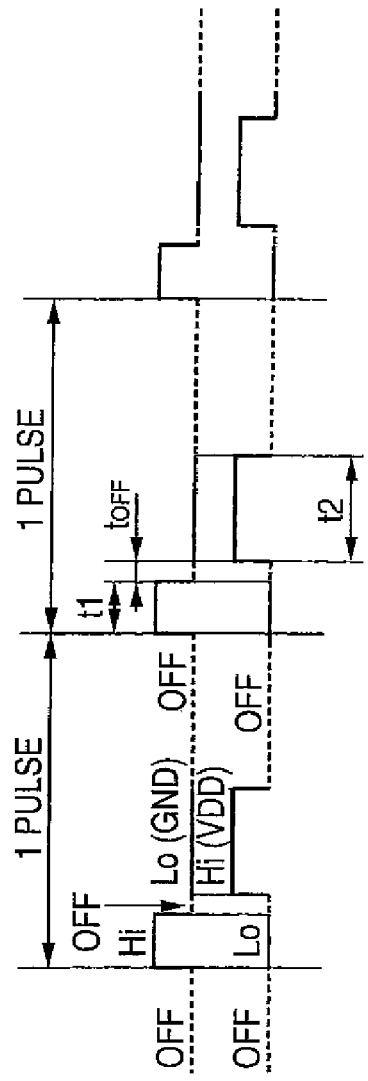
FIGS. 6A and 6B are waveform diagrams of an output signal to be outputted from the driving circuit shown in FIG. 4.
Figure 6B:
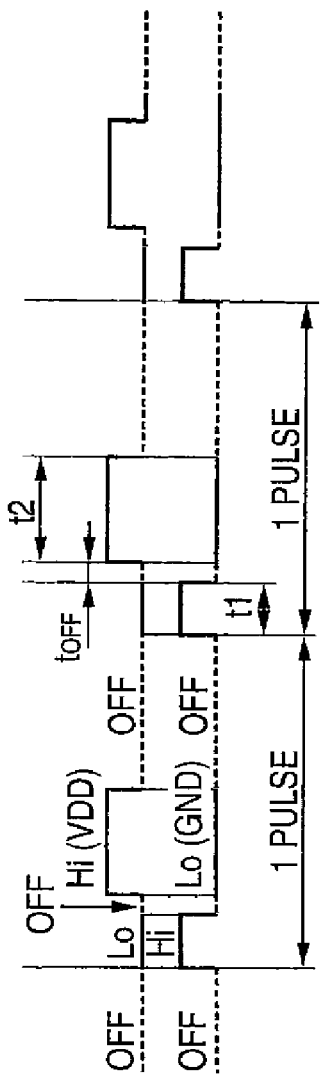

The actions of the driving apparatus 1, 10 or 100 are described hereinafter. FIG. 4 is a circuit diagram of a driving circuit for activating the piezoelectric element shown in FIGS. 1A, 11 and 1C. FIGS. 5A and 5B are waveform diagrams of an input signal to the inputted to the driving circuit shown in FIG. 4. FIGS. 6A and 6B are waveform diagrams of an output signal to be outputted from the driving circuit shown in FIG. 4.

As shown in FIG. 4, a driving circuit 31 is disposed in a control unit 30. This control unit 30 performs the entire control of the driving apparatus 1, and includes a CPU, a ROM, a RAM, an input signal circuit and an output signal circuit. The driving circuit 31 functions as a drive circuit for the piezoelectric element 4, and outputs a driving electric signal to the piezoelectric element 4. The driving circuit 31 inputs a control signal from the control signal generating unit of the control unit 30, and amplifies the control signal in voltage or amplitude and outputs an electric signal for driving the piezoelectric element 4. The driving circuit 31 used has its input stage constituted of logic circuits U1 to U3, for example, and its output stage equipped with field effect type transistors (FFT) Q1 and Q2. These transistors Q1 and Q2 can output a Hi-output (or a high-potential output), a Lo-output (or a low-potential output) and an OFF-output (or an open output) as their output signals.

FIG. 5A illustrates the input signal, which is inputted when the lens frame 2 is moved so that the engaged portion 2a may approach the piezoelectric element 4, and FIG. 5B illustrates the input signal, which is inputted when the lens frame 2 is moved so that the engaged portion 2a may leave the piezoelectric element 4. On the other hand, FIG. 6A illustrates the output signal, which is outputted when the lens frame 2 is moved so that the engaged portion 2a may approach the piezoelectric element 4, and FIG. 6B illustrates the output signal, which is outputted when the lens frame 2 is moved so that the engaged portion 2a may leave the piezoelectric element 4.

Output signals of FIGS. 6A and 6B are the pulse signals, which are turned ON/OFF at the same timings as those of the input signals of FIGS. 5A and 5B. The two signals of FIGS. 6A and 6B are inputted to the input terminals 4a and 4b of the piezoelectric element 4. Although pulse signals having sawtooth waveforms may be inputted to those input terminals 4a and 4b, the piezoelectric element 4 can be actuated, too, even if it is fed with pulse signals having rectangular waveforms, as shown in FIGS. 6A and 6B. In this case, the driving signals of the piezoelectric element 4 may be pulse signals having the rectangular waveforms so that the signal generations are facilitated.

The output signals of FIGS. 6A and 6B are constituted of two pulse signals of the common frequency. These two pulse signals are changed, by making their phases different each other, into either signals having such a potential difference as becomes stepwise large and abruptly small, or signals having such a potential difference as becomes abruptly large and stepwise small. By inputting these two signals, the expanding rate and the contracting rate of the piezoelectric element 4 can be made different to move the engaged portion 2a and accordingly the lens frame 2.

In FIGS. 6A and 6B, for example, the signals are set such that, after one was changed from Hi (High) to Lo (Low), the other becomes Hi. These signals are set such that the other signal becomes Hi after a given time lag $t_{OFF}$ elapsed when one signal becomes Lo. In case both the two signals are Lo, moreover, the output is turned OFF (or Open).

Signals of frequencies exceeding an audible frequency are used as the output signals of FIGS. 6A and 6B, that is, the electric signals for activating the piezoelectric element 4. In FIGS. 6A and 6B, the two signals are made to have frequencies exceeding the audible frequency, such as 30 to 80 KHz, preferably 40 to 60 KHz. The operating noise in the audible range of the piezoelectric element 4 can be reduced by using the signals of such frequency.

Thus, the driving apparatus 1, 10 or 100 acts in the following manners. Specifically, the electric signals are inputted to the piezoelectric element 4 so that the piezoelectric element 4 is caused to repeat the expansion and contraction by the inputs of the electric signals. In response to these expansion and contraction, the driving shaft 6 reciprocates. By making different the expanding rate and the contracting rate of the piezoelectric element 4, the velocity of the driving shaft 6 to move in one direction and the velocity to move in the other direction become different. As a result, the engaged portion 2a, accordingly the lens frame 2 is moved in the desired direction.

Figure 7:
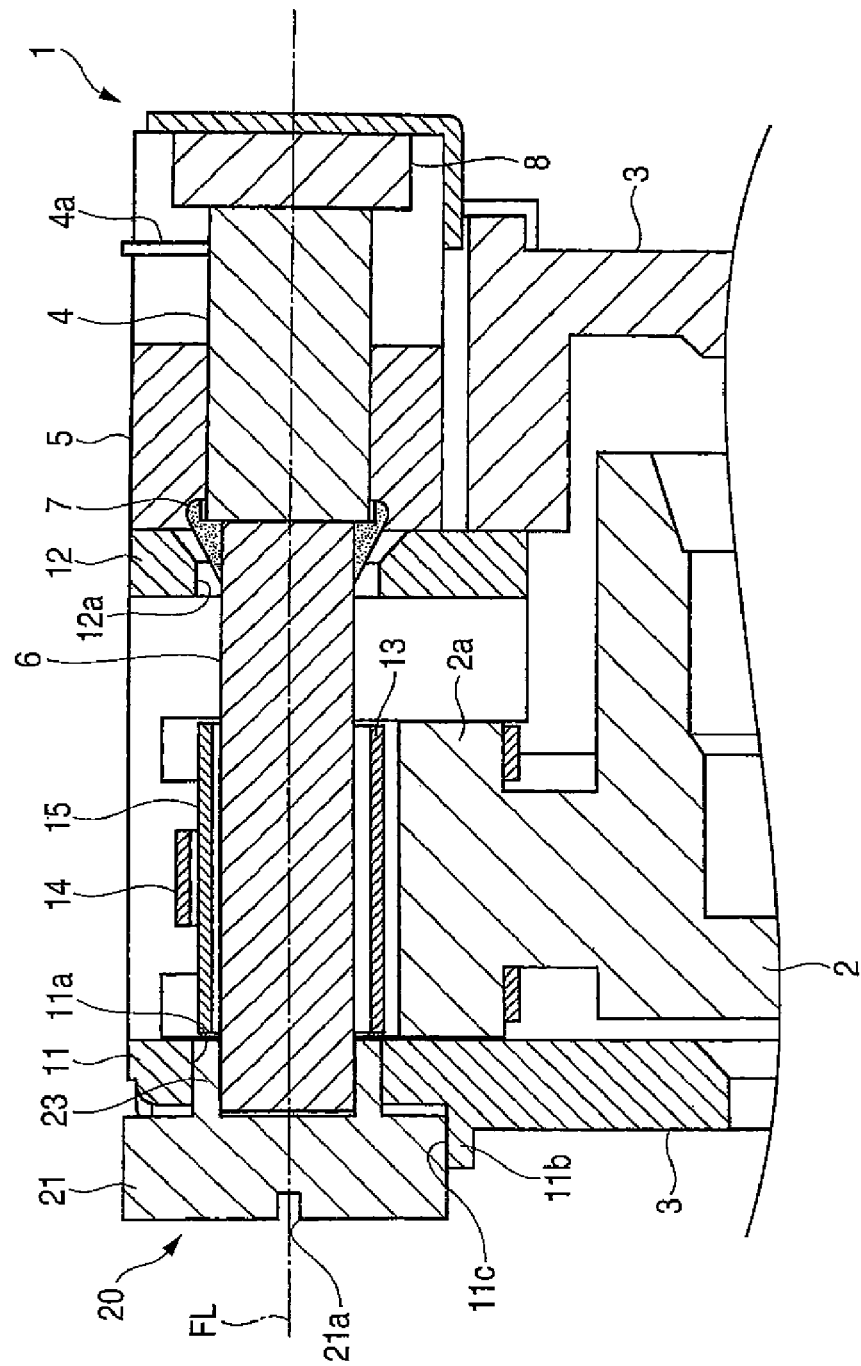
FIG. 7 is a sectional view of a portion showing another embodiment of the first embodiment of the driving apparatus according to the invention.
Figure 8:
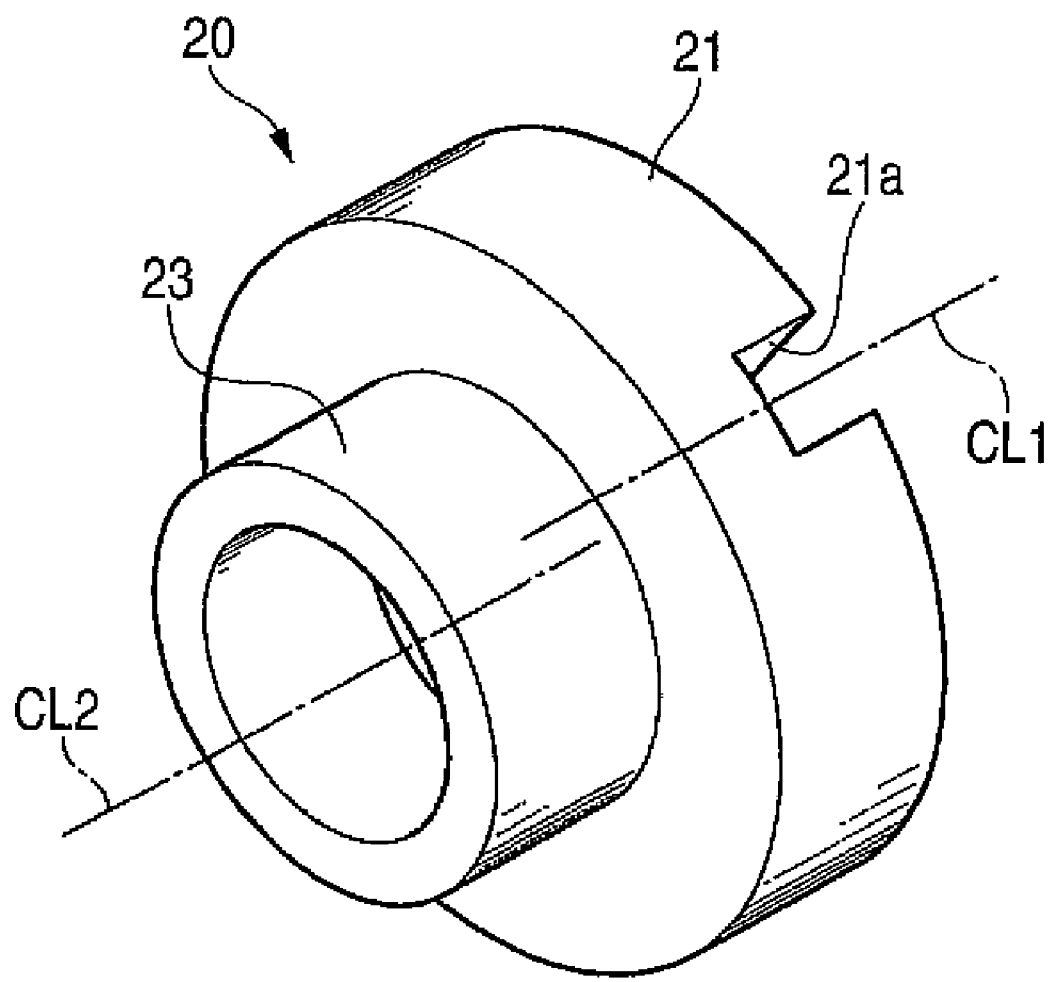
FIG. 8 is a perspective view of the inclination adjusting mechanism shown in FIG. 7.

FIG. 7 is a sectional view of a portion showing another embodiment of the first driving apparatus of the invention. In the driving apparatus 1, as shown in FIG. 7, the inclination adjusting mechanism 20 is provided with the column portion 21, which is tightly fitted from one side in the fitting portion 11b having the inner face 11c formed on the center line of the fiducial line FL in the partition 11, and a cylindrical portion 23, which is loosely fitted from the one side in the bearing hole 11a of the partition 11 and in which the one end portion of the driving shaft 6 is loosely fitted from the other side. Between the other end face of the column portion 21 and the one end face of the driving shaft 6, there is formed a clearance for keeping them out of contact even when the piezoelectric element 4 extends to its largest stroke. As shown in FIG. 8, the center line CL1 of the column portion 21 and the center line CL2 of the cylindrical portion 23 are made eccentric by the order of 1/100 mm, for example.

In the driving apparatus 1 thus constituted, the center line CL1 of the column portion 21 and the center line CL2 of the cylindrical portion 23 are made eccentric in the inclination adjusting mechanism 20. By rotating the column portion 21, which is fitted in the fitting portion 11b having the inner face 11c formed in the partition 11, on the fiducial line FL, therefore, the inclination of the driving shaft 6 with respect to the fiducial line FL can be adjusted easily and reliably.

The invention should not be limited to the aforementioned embodiments.

In the first embodiment, for example, the weight member 8 need not be fixed on the other end of the piezoelectric element 4, in case the piezoelectric element 4 is supported transversely of the extending direction of the fiducial line FL by the holder 3. Moreover, the support of the piezoelectric element 4 by the holder 3 need not be limited to the support transversely of the extending direction of the fiducial line FL, but may be made from the other side in the extending direction of the fiducial line FL by fixing the other end of the piezoelectric element 4 in the holder 3.

In the first embodiment, moreover, the driving shaft 6 is cylindrical, but its shape is not limited thereto. For example, the hollow portion 6a is formed as a recess of a circular section in the one end portion of the driving shaft 6, and the cylindrical portion 22 of the inclination adjusting mechanism 20 may be loosely fitted in the hollow portion 6a formed as the recess.

In the second embodiment, on the other hand, the driving shaft 6 is positioned if it is supported at at least three portions by the fitted portion 122. The notched portions 122b extending in the extending direction of the fiducial line FL may also be formed in the outer face of the fitted portion 122, so that the driving shaft 6 may be supported at four or more portions by the fitted portion 122.

Figure 10:
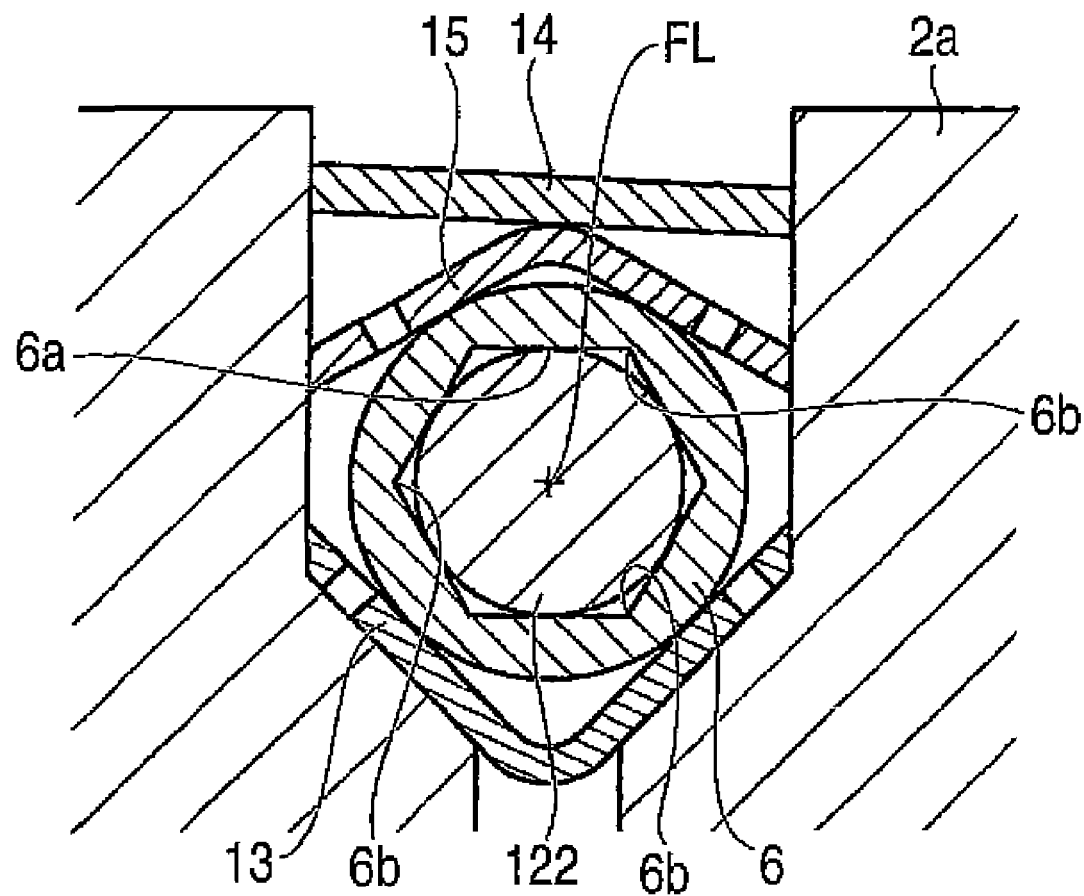
FIG. 10 is a longitudinal section of an engaged portion a lens frame of another embodiment of the second embodiment of the driving apparatus according to the invention.

As shown in FIG. 10, on the other hand, notched portions 6b extending in the extending direction of the fiducial line FL may be formed in the inner face of the hollow portion 6a of the driving shaft 6, so that the driving shaft 6 may be supported at at least three portions (or six portions, for example) by the fitted portion 122. In this case, too, the contact area between the outer face of the fitted portion 122 and the inner face of the hollow portion 6a of the driving shaft 6 can be reduced to smoothen the reciprocations of the driving shaft 6 relative to the fitted portion 122. Moreover, the driving shaft 6 is positioned with respect to the fitted portion 122 so that the inclination of the driving shaft 6 with respect to the fiducial line FL can be reliably prevented.

Figure 11:
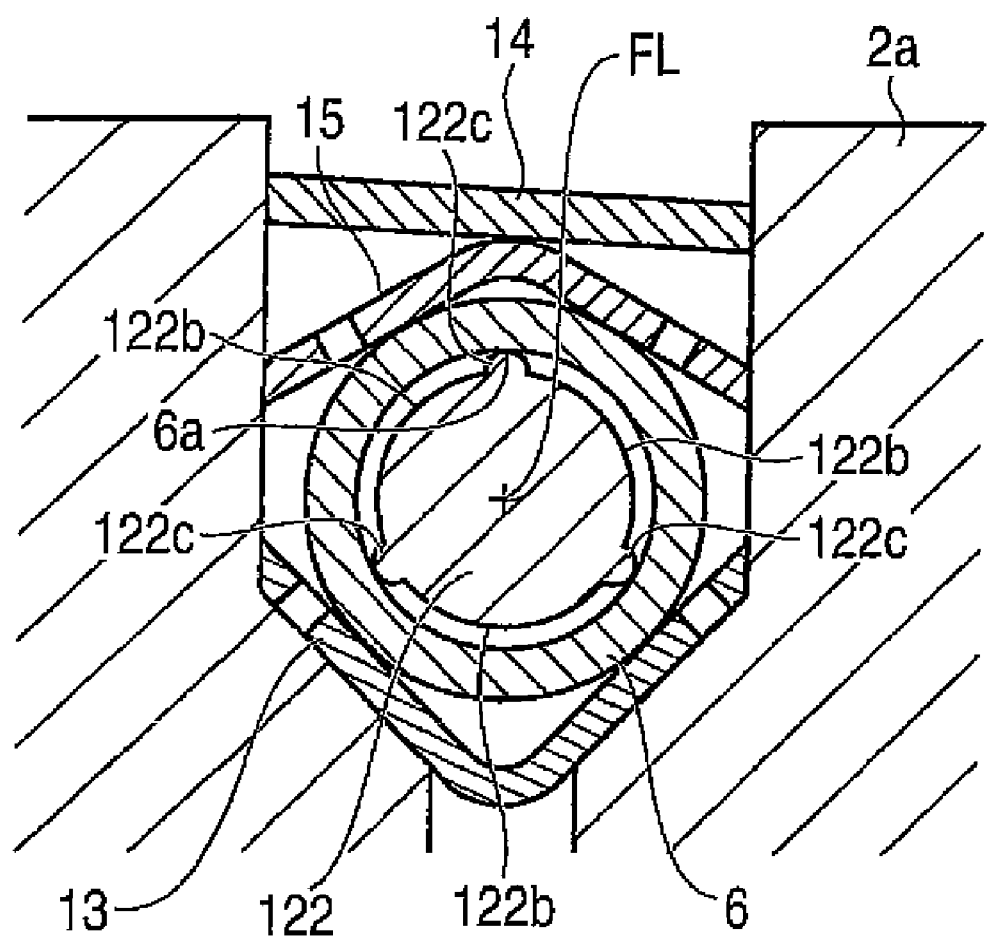
FIG. 11 is a longitudinal section of an engaged portion a lens frame of another embodiment of the second embodiment of the driving apparatus according to the invention.
Figure 12:
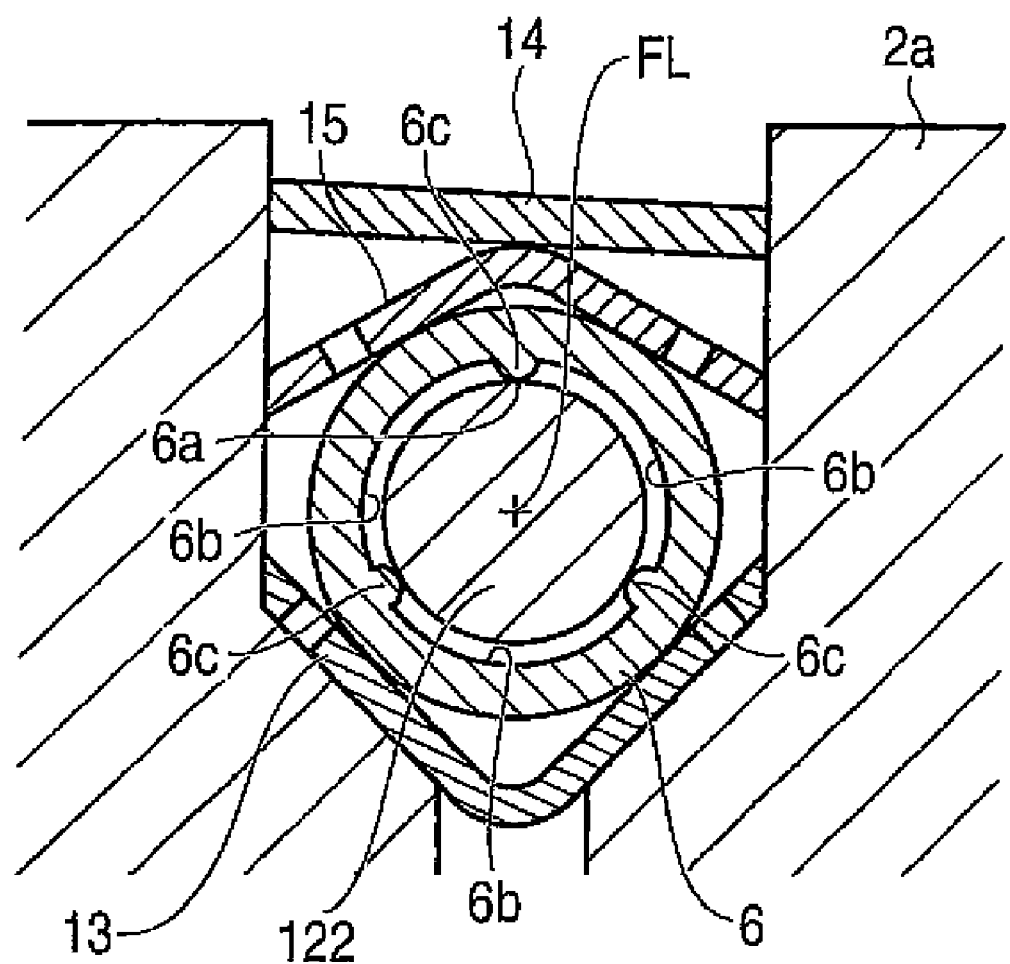
FIG. 12 is a longitudinal section of an engaged portion a lens frame of another embodiment of the second embodiment of the driving apparatus according to the invention.

Here, the notched portions 122b, as formed in the outer face of the fitted portion 122, and the notched portions 6b, as formed in the inner face of the hollow portion 6a of the driving shaft 6, may be formed into grooved shapes. As shown in FIG. 11, ridges 122c extending in the extending direction of the fiducial line FL may be formed by forming the grooved notch portions 122b extending in the extending direction of the fiducial line FL on the outer face of the fitted portion 122, so that the driving shaft 6 may be supported at at least three portions by the fitted portion 122. As shown in FIG. 12, ridges 6c extending in the extending direction of the fiducial line FL may be formed by forming the grooved notch portions 6b extending in the extending direction of the fiducial line FL on the inner face of the hollow portion 6a, so that the driving shaft 6 may be supported at at least three portions by the fitted portion 122. In these cases, too, the contact area between the outer face of the fitted portion 122 and the inner face of the hollow portion 6a of the driving shaft 6 is reduced by either at least three ridges 122c to contact with the inner face of the hollow portion 6a of the driving shaft 6 or at least three ridges 6c to contact with the outer face of the fitted portion 122. As a result, the driving shaft 6 can be smoothly reciprocated with respect to the fitted portion 122, and the driving shaft 6 is positioned with respect to the fitted portion 122, so that the inclination of the driving shaft 6 with respect to the fiducial line FL can be reliably prevented.

On the other hand, the notched portions need not always be formed in the outer face of the fitted portion 122 or in the inner face of the hollow portion 6a of the driving shaft 6. In this case, the outer face of the fitted portion 122 or the inner face of the hollow portion 6a of the driving shaft 6 can be subjected to a surface treatment capable of reducing the friction coefficient, such as a chemical polishing, electrolytic polishing or lubricant-plating treatment, thereby to smoothen the reciprocations of the driving shaft 6 with respect to the fitted portion 122.

In case the piezoelectric element 4 is supported transversely of the extending direction of the fiducial line FL by the holder 3, the weight member 8 need not be fixed on the other end of the piezoelectric element 4. Moreover, the support of the piezoelectric element 4 by the holder 3 should not be limited to the support transverse to the extending direction of the fiducial line FL, but may be exemplified from the other side in the extending direction of the fiducial line FL by fixing the other end of the piezoelectric element 4 in the holder 3.

In the second embodiment, moreover, the driving shaft 6 is cylindrical, but its shape should not be limited thereto. For example, the hollow portion 6a is formed as the recess of a circular section in the one end portion of the driving shaft 6 and the fitted portion 122 of the support member 120 may be loosely fitted in the hollow portion 6a formed as the recess.

Figure 14:
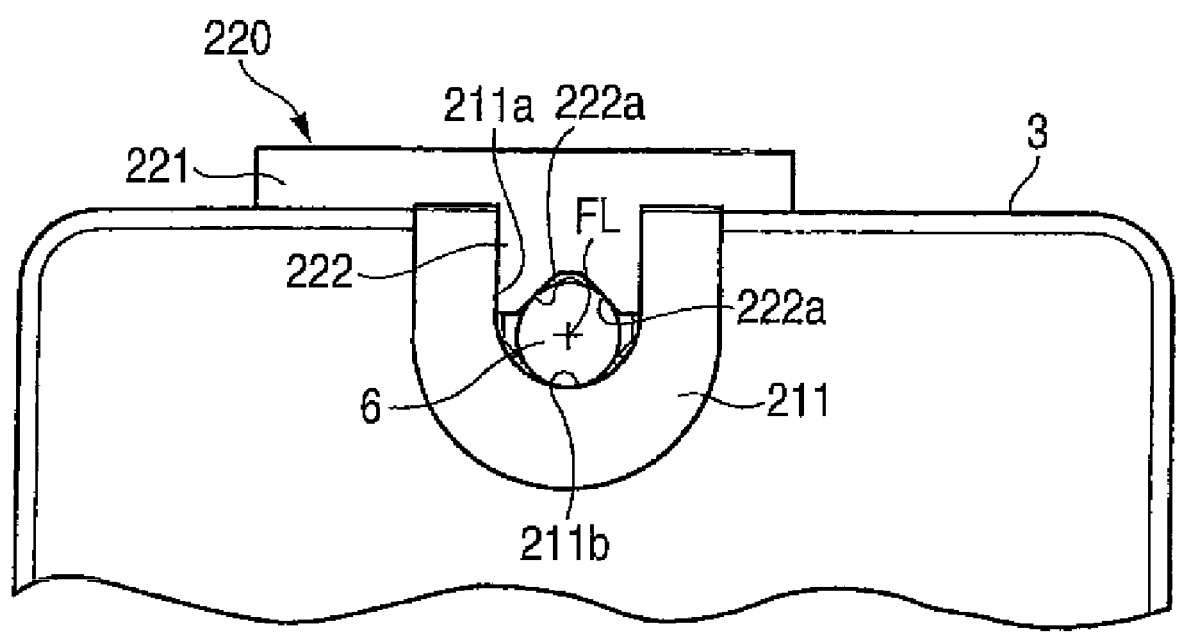
FIG. 14 is a front elevation of the vicinity of the bearing groove of another embodiment of a third embodiment of the driving apparatus according to the invention.

In the third embodiment, as shown in FIG. 14, the driving shaft 6 may also be supported at three portions by the inner face 211b formed into the U-shaped section in the bearing groove 211a and by the two inner faces 222a formed into the V-shaped section in the pushing portion 222. This constitution is likewise applied to the bearing grooves 212a. Here, the driving shaft 6 is positioned, if it is supported at at least three portions, and may be supported at four or more portions.

Figure 15:
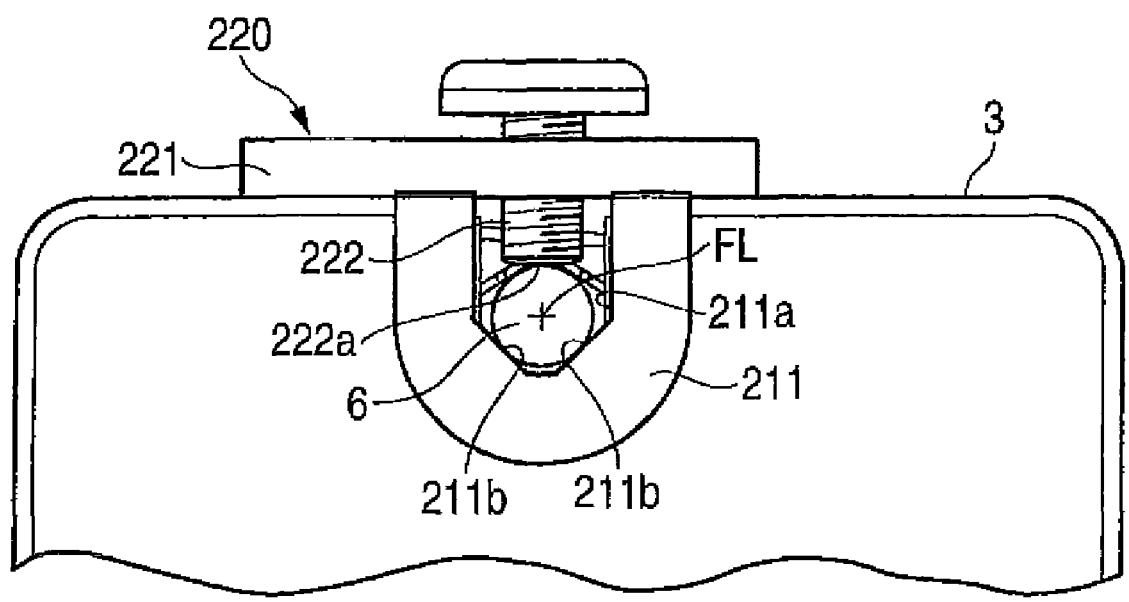
FIG. 15 is a front elevation of the vicinity of the bearing groove of another embodiment of the third embodiment of the driving apparatus according to the invention.
Figure 16:
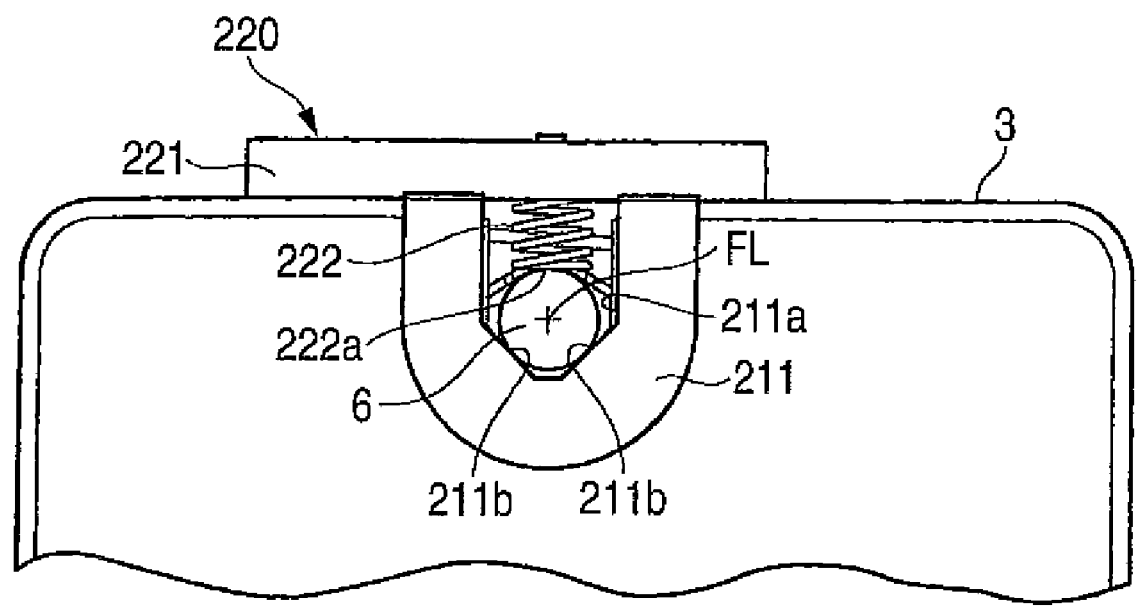
FIG. 16 is a front elevation of the vicinity of the bearing groove of another embodiment of the third embodiment of the driving apparatus according to the invention.

On the other hand, the pushing portion 222 may also be either a screw fastened in the fixed portion 221, as shown in FIG. 15, or a spring mounted in a compressed state in the fixed portion 221, as shown in FIG. 16. In case the pushing portion 222 is the screw, the pushing force of the driving shaft 6 onto the inner faces of the bearing grooves 211a and 212a can be adjusted by the fastening degree of the pushing portion 222. In case the pushing portion 222 is the spring, the pushing force of the driving shaft 6 onto the inner faces of the bearing grooves 211a and 212a can be adjusted by changing the spring constant.

Moreover, the pushing portion 222 should not be limited to that for pushing the driving shaft 6 onto the inner faces of the bearing grooves 211a and 212a, but may also be one for reducing the clearances between the outer face of the driving shaft 6 and the inner faces of the bearing grooves 211a and 212a. In this case, too, the inclination of the driving shaft 6 with respect to the fiducial line FL can be regulated by the regulating member 220 so that the inclination of the driving shaft 6 with respect to the fiducial line FL can be prevented.

In case the piezoelectric element 4 is supported transversely of the extending direction of the fiducial line FL by the holder 3, on the other hand, the weight member 8 need not be fixed on the other end of the piezoelectric element 4. Moreover, the support of the piezoelectric element 4 by the holder 3 should not be limited to the transverse one with respect to the extending direction of the fiducial line FL, but may also be made from the other side of the extending direction of the fiducial line FL by fixing the other end of the piezoelectric element 4 in the holder 3.

According to the invention, it is possible to prevent the inclination of the driving shaft with respect to the given fiducial line.

The entire disclosure of each and every foreign patent application from which the benefit of foreign priority has been claimed in the present application is incorporated herein by reference, as if fully set forth.

What is claimed is:

1. A driving apparatus comprising:
   an electromechanical conversion element that expands and contracts in an extending direction of a given fiducial line;
   a driving shaft mounted on one end of the electromechanical conversion element in the extending direction;
   a driven member frictionally engaged with the driving shaft;
   a holder that supports the electromechanical conversion element and comprises a bearing portion for the driving shaft; and
   an inclination adjusting mechanism, disposed in the bearing portion, that variably adjusts inclination of the driving shaft with respect to the fiducial line.

2. A driving apparatus of claim 1,
   wherein the electromechanical conversion element is elastically supported by the holder.

3. A driving apparatus of claim 1,
   wherein the holder further comprises a fitting portion having an inner face, the inner face being formed with the fiducial line as a center line,
   the driving shaft comprises a hollow portion at least one of end portions of the driving shaft,
   the inclination adjusting mechanism comprises: a first column portion fitted in the fitting portion of the holder; and a second column portion fitted in the hollow portion of the driving shaft, and
   a first center line of the first column portion and a second center line of the second column portion are eccentric.

4. A driving apparatus of claim 1,
   wherein the holder further comprises a fitting portion having an inner face, the inner face being formed with the fiducial line as a center line, the inclination adjusting mechanism comprises: a column portion fitted in the fitting portion of the holder; and a cylindrical portion to which one end portion of the driving shaft is fitted, and
   a first center line of the column portion and a second center line of the cylindrical portion are eccentric.

5. A method for manufacturing a driving apparatus of claim 1, the method comprising:
   adjusting inclination of the driving shaft with respect to the fiducial line before an adhesive for supporting the electromechanical conversion element in the holder is hardened.

6. A driving apparatus comprising:
   an electromechanical conversion element that expands and contracts in an extending direction of a given fiducial line;
   a driving shaft mounted on one end of the electromechanical conversion element in the extending direction;
   a driven member frictionally engaged with the driving shaft;
   a holder that supports the electromechanical conversion element and comprises a bearing portion for the driving shaft; and
   an inclination adjusting mechanism, disposed in the bearing portion, that adjusts inclination of the driving shaft with respect to the fiducial line,
   wherein the holder further comprises a fitting portion having an inner face, the inner face being formed with the fiducial line as a center line,
   the driving shaft comprises a hollow portion at least one of end portions of the driving shaft,
   the inclination adjusting mechanism comprises: a first column portion fitted in the fitting portion of the holder; and a second column portion fitted in the hollow portion of the driving shaft, and
   a first center line of the first column portion and a second center line of the second column portion are eccentric.

7. A driving apparatus comprising:
   an electromechanical conversion element that expands and contracts in an extending direction of a given fiducial line;
   a driving shaft mounted on one end of the electromechanical conversion element in the extending direction;
   a driven member frictionally engaged with the driving shaft;

a holder that supports the electromechanical conversion element and comprises a bearing portion for the driving shaft; and an inclination adjusting mechanism, disposed in the bearing portion, that adjusts inclination of the driving shaft with respect to the fiducial line, wherein the holder further comprises a fitting portion having an inner face, the inner face being formed with the fiducial line as a center line, the inclination adjusting mechanism comprises: a column portion fitted in the fitting portion of the holder; and a cylindrical portion to which one end portion of the driving shaft is fitted, and a first center line of the column portion and a second center line of the cylindrical portion are eccentric.

* * * * *